(12) United States Patent
Young

(10) Patent No.: US 10,932,624 B2
(45) Date of Patent: Mar. 2, 2021

(54) SANITATION PAIL WITH POUR AND SEDIMENT COLLECTION FEATURES

(71) Applicant: San Jamar, Inc., Elkhorn, WI (US)

(72) Inventor: Michael Young, Mukwonago, WI (US)

(73) Assignee: San Jamar, Inc., Elkhorn, WI (US)

( * ) Notice: Subject to any disclaimer, the term of this patent is extended or adjusted under 35 U.S.C. 154(b) by 40 days.

(21) Appl. No.: 15/997,088

(22) Filed: Jun. 4, 2018

(65) Prior Publication Data
US 2019/0365159 A1    Dec. 5, 2019

(51) Int. Cl.
*A47J 47/18* (2006.01)
*A47L 13/51* (2006.01)

(52) U.S. Cl.
CPC ............. *A47J 47/18* (2013.01); *A47L 13/51* (2013.01)

(58) Field of Classification Search
CPC ............... B65D 25/32; B65D 25/2867; B65D 2543/00148; B65D 2543/00129; A47J 47/18; A47L 13/58
USPC ............ 220/773, 675, 669; 15/264; D23/53
See application file for complete search history.

(56) References Cited

U.S. PATENT DOCUMENTS

| 1,517,164 | A |   | 11/1924 | Lear |   |
|---|---|---|---|---|---|
| 2,671,239 | A |   | 3/1954 | Wisner |   |
| 2,712,668 | A |   | 7/1955 | Thiele |   |
| 2,896,809 | A |   | 7/1959 | Metzger et al. |   |
| 3,338,468 | A |   | 8/1967 | Wilson |   |
| 3,384,263 | A | * | 5/1968 | Bernstein | B65D 1/22 206/519 |
| 3,829,926 | A |   | 8/1974 | Salladay |   |
| 4,941,586 | A | * | 7/1990 | Tarna | A47J 47/18 220/17.1 |
| 5,119,571 | A |   | 6/1992 | Beasley |   |
| 5,269,438 | A |   | 12/1993 | Kelsey |   |
| 5,412,818 | A |   | 5/1995 | Chen |   |
| D386,866 | S | * | 11/1997 | Craft | D34/1 |
| D387,530 | S | * | 12/1997 | Doxey | D34/1 |
| 5,715,968 | A | * | 2/1998 | Fink | A45C 3/04 220/669 |

(Continued)

FOREIGN PATENT DOCUMENTS

| EP | 2774526 A2 | 9/2014 |
|---|---|---|
| WO | 2014022888 A1 | 2/2014 |

OTHER PUBLICATIONS

European Search Report dated Oct. 16, 2019.

*Primary Examiner* — James N Smalley
*Assistant Examiner* — Jennifer Castriotta
(74) *Attorney, Agent, or Firm* — Boyle Fredrickson S.C.

(57) ABSTRACT

A sanitation pail having a body that defines a fluid cavity and a bail that is pivotably connected to the body. The body includes a base and a number of side walls that extend in an upward manner from the base. The base includes a raised portion that is disposed between respective adjacent lower portions of the base. The downward directed surface of the base defines a number of grip sites associated with the bottom of the body. The sidewalls have a generally hourglass cross section shape wherein each discrete corner associated with the sidewalls defines a curved pour spout. Additional handles or grip sites extend from the body proximate the upper edge of body and are associated with radially inward directed curved portions of the body such that the additional handles do not exceed outward beyond the adjacent corners.

21 Claims, 9 Drawing Sheets

(56) References Cited

U.S. PATENT DOCUMENTS

| | | | |
|---|---|---|---|
| 5,813,567 A * | 9/1998 | Mangano | A47L 13/58 15/264 |
| 5,971,199 A * | 10/1999 | Jackson | A47L 13/58 15/264 |
| 6,062,389 A | 5/2000 | Kent | |
| 6,095,333 A * | 8/2000 | Bertrand | A63H 33/32 206/505 |
| 6,105,813 A | 8/2000 | Abbey | |
| 6,138,863 A | 10/2000 | Aiken | |
| 6,269,967 B1 * | 8/2001 | de Vries | B65D 1/22 206/519 |
| 6,293,692 B1 | 9/2001 | Bowsher et al. | |
| D489,286 S * | 5/2004 | Rogers | D11/143 |
| 6,761,271 B1 | 7/2004 | Cresswell | |
| 7,410,074 B1 | 8/2008 | Brunning | |
| 8,770,432 B2 | 7/2014 | Rueckheim et al. | |
| D778,519 S | 2/2017 | Luburic | |
| 2005/0252921 A1 * | 11/2005 | Van Landingham, Jr. | A47L 13/20 220/608 |
| 2007/0119854 A1 | 5/2007 | Rittmann | |
| 2008/0190930 A1 * | 8/2008 | Vogel | B65D 21/0222 220/276 |
| 2011/0000046 A1 | 1/2011 | Chen et al. | |
| 2011/0163107 A1 * | 7/2011 | Saunders | B01F 7/0035 220/694 |
| 2016/0075464 A1 * | 3/2016 | Turner | B65D 19/04 220/604 |
| 2016/0236817 A1 * | 8/2016 | Albrecht | B65D 25/32 |

\* cited by examiner

SANITATION PAIL WITH POUR AND SEDIMENT COLLECTION FEATURES

BACKGROUND OF THE INVENTION

This invention relates generally to a pail and, more particularly, to a stackable pail that includes opposing side walls with inwardly extending arcuate portions and a contoured inner bottom surface that is well suited for use as a sanitation or wash pail.

Sanitation pails are well known in the art as being useful in cleaning and sanitizing activities in various industries and applications including the food service industry, such as in kitchens and restaurants for example. Sanitation pails are commonly configured to retain a volume of liquid and a cleaning device, such as a sponge or cloth, within a reservoir. For ease of transport, such pails commonly includes a bail or handle that is pivotably or hingedly affixed to opposing sides of the pail and allow a user to grasp the bail of the pail for pouring and/or transport activities. That arrangement also facilitates pouring out liquid from the pail by grasping the bail in one hand and rotating the pail upwards while grasping the outer bottom surface of the pail. Sanitation pails are provided in a variety of sizes, shapes, and configurations that are commonly configured for suitability during its intended use and/or storage. Additionally, sanitation pails are often color coded and/or printed with visual indicia, commonly in compliance with HACCP guidelines, to aid in eliminating confusion and/or contamination between cleaning and sanitizing solutions, containers, and/or cleaning and/or sanitizing devices such as cloths or the like.

Some sanitation pail configurations can present significant issues with respect to the ability to accurately pour liquid from the pail. That is, during use, a pail with four generally perpendicular side walls does not present a geometry that constricts liquid into a specified flow path, thereby rendering precise emptying of the pail difficult to attain. This is particularly true of larger volume cleaning and sanitation pails, which can hold a significant weight or volume of liquid therein and may become difficult or unwieldy for some individuals to lift and/or empty. In an effort to remedy this shortcoming, some pails incorporate spouts that are commonly formed in an upper lip of the pail. However, such spouts often extend outwardly from the side wall of the pail thereby unnecessarily increasing the footprint of the pail and undesirably increasing the spatial requirements associated with storage and/or shipping activities of such pails. Accordingly, there is a need to provide a sanitation pail having a restricted path for pouring liquids and which does not unduly increase the spatial requirements or a footprint as defined by an outer boundary of the resultant pail.

Regardless of the intended use of such pails, it is also periodically desirable to grasp, hold or transport the pail without the use of the bail style handle. Such instances can include activities associated with shorter users dumping of the contents of the pail after use in utility or slop sinks or the like with elevated edges and/or instances wherein adjacent structures inhibit the user's interaction with the bail in a desired manner. However, many pails, even those lacking integrated handles, are poorly suited for such tasks as they provide no location aside from an upper lip and bottom of the respective pail for an individual to securely grasp the pail and effectuate the desired pouring action.

In an attempt to remedy such disadvantages, some pails incorporate opposing handles that project outwardly from opposing sides of the upper lip of the pail. However, much like the outwardly projecting spout, such handle configurations also unduly increases the footprint of the pail which increases the space required for storage and shipping of such pails. Accordingly, there is a further need for a sanitation pail having one or more handles that are ergonomically constructed and oriented, provide a plurality of two-handed grip interactions with the pail, and do not unduly increase the overall spatial requirements of the pail.

Still further, conventional sanitation pails often include a substantially flat inner bottom surface. In use, such pails are susceptible to allowing cleaning and/or sanitizing devices, such as a cleaning or sanitizing cloths or wipes, to rest within the solution contained within the pail and frequently on the inner bottom surface of the pail when the cleaning device is not in use and/or during transport of the cleaning and/or sanitation pail. Whether suspended in the solution or in contact with the bottom of the pail, the cleaning device is commonly left in contact with previously collected particulate matter such as sediment, food waste, etc. that is suspended in the solution and/or has settled to the bottom of the contents of the pail. Understandably, during continued use of such pails, and the solutions and cleaning devices or implements associated therewith, repeated rinse activities during a user's cleaning endeavor frequently results in variety of undesirable results such as repeated aggravation of the previously collected sediment, mixing of the sediment with the cleaning and/or sanitizing solution or treatment media, suspension of the previously collected sediment within the treatment media solution, and the repeated undesirable reintroduction of previously collected sediment with the cleaning device during each subsequent rinsing operations.

Although suspension of the cleaning device in a hanging orientation from the lip or bail of the pail can isolate flexible cleaning devices from the contents of the pail when the cleaning device is not in use, such approaches leave the cleaning devices susceptible to undesirable or intentional contamination or soiling due inadvertent or unintended contact of the cleaning device with contaminants that originate from locations external to the pail. Such approaches can be particularly problematic when the cleaning device is hung from the bail in that the trailing portions of flexible cleaning device such as cloths or wipes may achieve orientations wherein the cleaning device contacts the exterior walls of the pail, countertop or other support structures, and/or the outwardly directed bottom portion of the pail if the pail is inadvertently set upon the trailing or free edges of the cleaning device. Accordingly, there is a further need for a sanitation pail that can accommodate storage of cleaning devices within the confines of the pail but in a manner wherein the cleaning device can be at least partially isolated from the solution within the container when the device is not in use. There is a still further need for a sanitation pail that is constructed to encourage separation and mitigate suspension of previously collected particulate matter and/or debris within the liquid treatment solution during use and/or transport of the sanitation pail.

Accordingly, a need exists for a sanitation pail that is relatively inexpensive to manufacturer or produce; easy to grasp and manipulate from a plurality of handle and grips sites that do not appreciably compromise the overall spatial requirements of the pail; provides improved pouring capabilities; accommodates storage of cleaning devices within the pail and in a more sanitary manner than the cleaning devices being suspended in the cleaning solution; and/or is constructed to improve the collection, separation, and isolation of previously collected sediment and/or debris from liquid treatment solutions contained in the pail during use and transport of the pail.

SUMMARY OF THE INVENTION

The present invention discloses a sanitation pail that resolves one or more of the shortcomings disclosed above.

One aspect of the present invention discloses a sanitation pail system that includes a body having a bottom and a series of walls that extend upwardly from the bottom to form a fluid cavity. The bottom of the body includes a first side portion, a second side portion, and a raised portion positioned between the first and second side portions. The series of walls includes a first wall and a second wall that is generally opposite the first wall. A medial portion of the first wall and a medial portion of the second wall are each formed by a respective first and second radially inwardly extending arcuate portion such that the medial arcuate portions of the respective first and second walls are disposed radially inboard of a respective imaginary line that is tangential to opposing end portions of the respective first wall and second wall associated with an open end of the fluid cavity.

Another aspect of the present invention usable or combinable with one or more of the above aspects discloses third and fourth substantially planar walls that extend between opposing ends of the first and second walls and include respective bail attachment points disposed on the radially outer surfaces of the third and fourth walls proximate the open end of the body.

Another aspect of the present invention usable or combinable with one or more of the aspects disclosed above includes a sanitation pail system wherein the series of side walls have a substantially hourglass lateral cross-sectional shape.

Still another aspect of the present invention usable or combinable with one or more of the aspects disclosed above includes a series of baffles located along the fluid cavity facing surface of one or more of the first side portion and the second side portion of the bottom of the body.

Another aspect of the present invention usable or combinable with one or more of the above aspects discloses one or more carrying handles that extend radially outward from a respective medial portion of a respective one of the first wall and the second wall proximate the open end of the body. Preferably, one or more of the carrying handles lies radially inboard of the outermost portion of the adjacent corners of the respective one of the series of walls.

Another aspect of the present invention that is usable or combinable with one or more of the aspects disclosed above includes shaping the bottom of the body such that an underside of the raised portion of the bottom defines a handle for use in tipping or pivoting the body about the bail attachment points during pouring of fluid from a respective corner of the body.

These and other aspects, features, and advantages of the present invention will become apparent from the detailed description, claims, and accompanying drawings.

DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

DETAILED DESCRIPTION OF THE PREFERRED EMBODIMENTS

Figure 1:
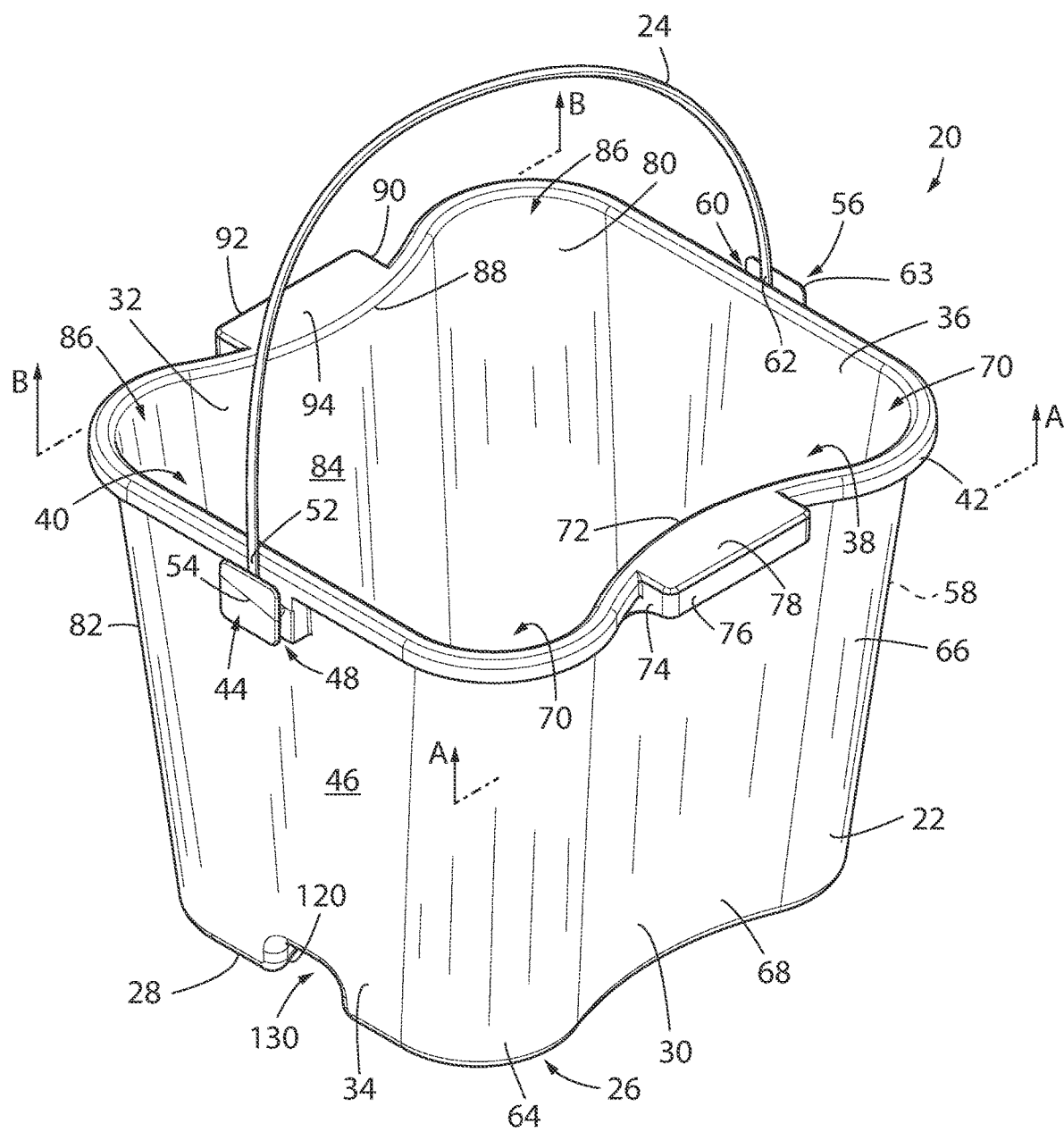
FIG. 1 is a perspective view of a sanitation pail system according to the present invention and having a bail handle oriented to extend in a generally upward direction from a body of the pail system.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. The various features and advantageous details of the subject matter disclosed herein are explained more fully with reference to the non-limiting embodiments described in detail in the following description.

Illustrative embodiments of a sanitary pail system 20 in accordance with various aspects of the present invention are shown in FIG. 1 through FIG. 7. Referring to FIGS. 1-5, sanitary pail system 20 includes a pail, body portion, or a body 22 and a bail handle or bail 24 that preferably rotatably and removably cooperates with body 22. Body 22 is generally defined by a bottom or base 26 that is defined by a perimeter 28 that extends about the outer edge of the base 26. A front wall 30 of body 22 extends in a generally upward direction from a first edge of the perimeter 28 generally perpendicular to the base 26.

Figure 6:
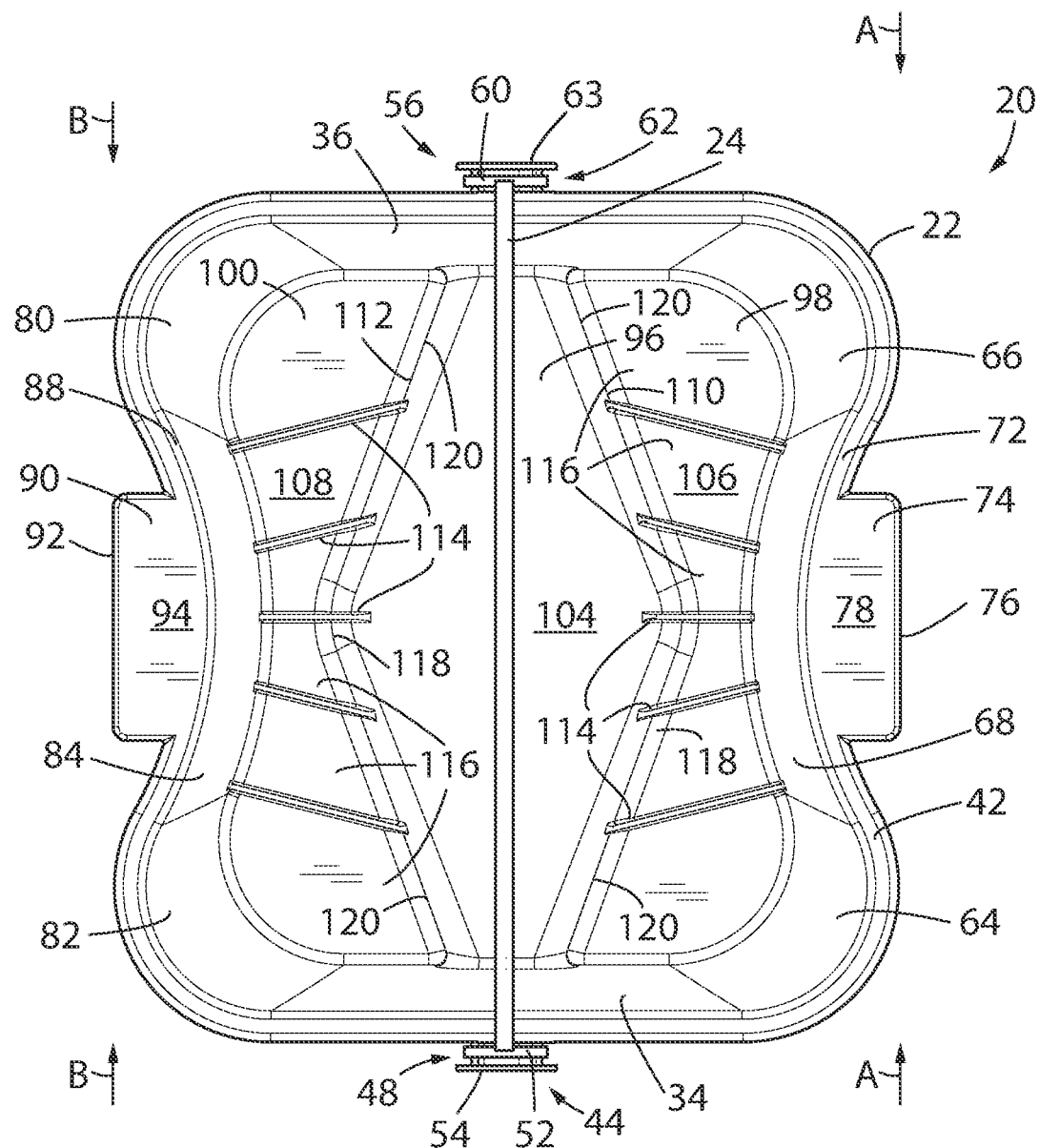
FIG. 6 is a top plan view of the sanitation pail system of FIG. 1.
Figure 7:
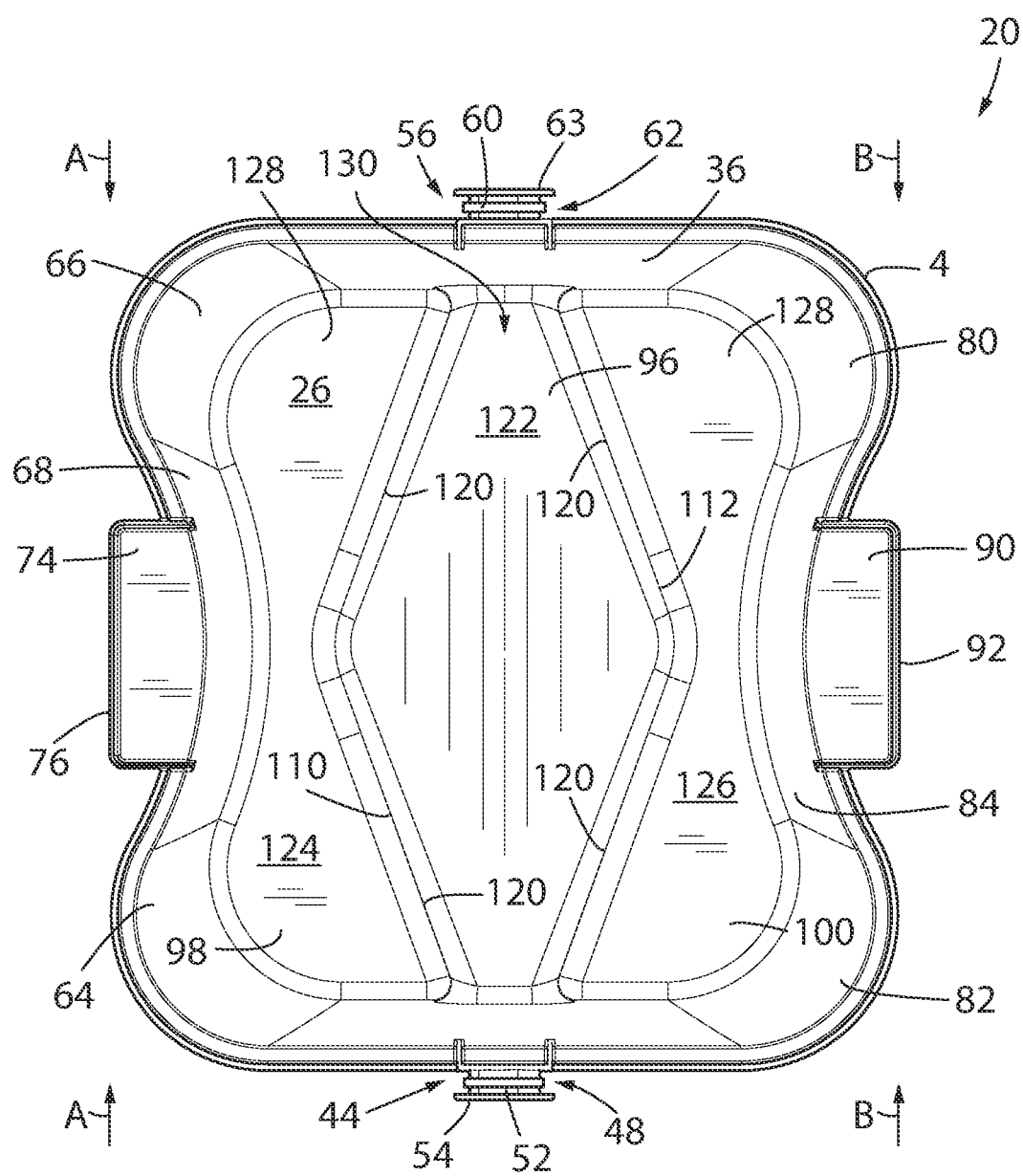
FIG. 7 is a bottom plan view of the sanitation pail system of FIG. 1.

Referring briefly to FIGS. 6 and 7, which are respective top and bottom plan views of body 22, it should be appreciated that the upstanding walls that extend from base 26, or discrete portions thereof, can be oriented to extend in a perpendicular direction from an imaginary plane associated with base 26 or, more preferably, the sidewalls of body 22 extend in a slightly canted of crossing direction relative to a perpendicular direction associated with the imaginary plane defined by base 26 such that base 26 of body 22 has a smaller cross-sectional geometric footprint than a geometric footprint defined by the open or upper end of body 22. Such an understanding can be appreciated from FIGS. 6 and 7 wherein portions of the circumferential sidewalls of body 22 are visible when body 22 is viewed from orientations normal to, either directly above or directly below, body 22.

Referring back to FIGS. 1-5, body 22 includes a rear wall 32 that is generally opposite front wall 30. Rear wall 32 extends from an opposite edge of the perimeter 28 of the base 26 relative to front wall 30 and a first side wall 34 and a second side wall 36 extend upwardly from the base 26 between the front wall 30 and rear wall 32. Front wall 30, rear wall 32, and side walls 34, 36 are generally circumferentially continuous and cooperate with base 26 such that body 22 has a substantially continuous and uninterrupted shape. Collectively, base 26 and walls 30, 32, 34, 36 of body 22 form an interior void, fluid cavity, blind opening, or cavity 38 having an open end or open top 40. Aside from open top 40, body 22 of sanitation pail system 20 is preferably fluid tight and facilitates the storage and transportation of liquids, such as cleaning and sanitizing liquids or solutions within cavity 38. It should be appreciated that pail system 20 may be used for various objectives associated with cleaning and sanitization objectives associated with placement of a solution in the form of a fluid media, or diluted solution associated therewith, within the fluid cavity defined by body 22.

Open top 40 of body 22 is defined by a lip 42 that extends preferably continuously in a circumferential manner about an upward directed or upper oriented edge of each of walls 30, 32, 34, 36. As shown in FIG. 1, the lip 42 may be rounded or outwardly curled as to provide a smooth surface that aids in pouring liquids from the cavity 38 when the sanitation pail system 20 is emptied, as will be described in further detail below. Although lip 42 is shown as being oriented entirely within a common imaginary plane, it is appreciated with lip 42 could be shaped such that discrete portions of lip 42 are oriented at elevated or lowered positions relative to other portions of lip.

Collectively, the interior facing latitudinal cross section shape of body 22 of the sanitation pail system 20 is approximately hourglass shaped, as indicated by the general shape of the lip 42 (FIGS. 1 and 6) and will be described in further detail below. Preferably, the hourglass lateral cross section shape defined by body 22 extends from lip 42 toward base 26 in a manner wherein the area associated with the discrete cross sections decreases as indicted by the inclined walls 30, 32, 34, 36 of body 22. Sidewalls 30, 32, and more specifically the radially inward curved portions thereof, define a constriction of the hourglass shape between the inward facing surfaces of sidewalls 30, 32. As walls 30, 32, 34, 36 extend generally upwardly from the base 26, walls 30, 32, 34, 36 may flair slightly in an outward radial direction as they extend between base 26 towards lip 42. Such a consideration provides a construction wherein the outer perimeter of the body 22 is larger at the lip 42 than the perimeter 28 of the base 26 but is maintains the generally hourglass shaped cross section along the height of body 22 between base 26 and lip 42. In this configuration, the sanitation pail system 20 is particularly well suited for nesting or stacking with the body 22 of one exemplary sanitation pail system 20 being received within the cavity 38 of an adjacent underlying sanitation pail system 20, which may be repeated for a series of sanitation pail systems 20.

The body 22 of the sanitation pail system 20 is preferably formed of a molded or thermoformed plastic material. It is appreciated that body 22 of the sanitation pail system 20 may be provided in any number of colors and sizes. In one embodiment of the present invention, body 22 of the sanitation pail system 20 is formed of a color-coded material wherein the color of body 22 distinguishes respective intended uses associated with a discrete pail. For example, a sanitation pail system 20 that is intended for use with a soap and/or cleaning solutions or operations may be formed of one color, such as green, while a sanitation pail system 20 that is intended for use of sanitizing operations and/or to contain sanitizing solutions, may be formed of another color, such as red. Such a consideration allows personal remote from pail system 20 to readily ascertain the contents and/or intended use of discrete pail systems 20 associated with a given environment. Additionally, an outer surface of one or more of the walls 30, 32, 34, 36 of body 22 may include printed or molded additional instructions, warnings, labels or indicia that further identify the intended use or intended contents associated with a given discrete sanitation pail system 20.

Still referring to FIGS. 1-5, in one embodiment of the invention, a first boss or bail attachment point 44 extends radially outward from an outer surface 46 of the first side wall 34. The first bail attachment point 44 is preferably located proximate or adjacent the lip 42 at approximately a midpoint along the length of the first side wall 34, which is to say equidistance from the front wall 30 and rear wall 32. The first bail attachment point 44 includes a bail receiving portion 48, such as a bar or post, about which a first end 52 of the bail 24 can be rotatably attached. Lateral movement of the first end 52 of the bail 24 is inhibited by a bail retaining portion 54, which preferably has a larger cross sectional area than the bail receiving portion 48, thereby preventing the first end 52 of the bail 24 from sliding off or otherwise disengaging the bail receiving portion 48 which allowing bail 24 to rotate uninhibited about pail receiving portion 48.

Figure 4:
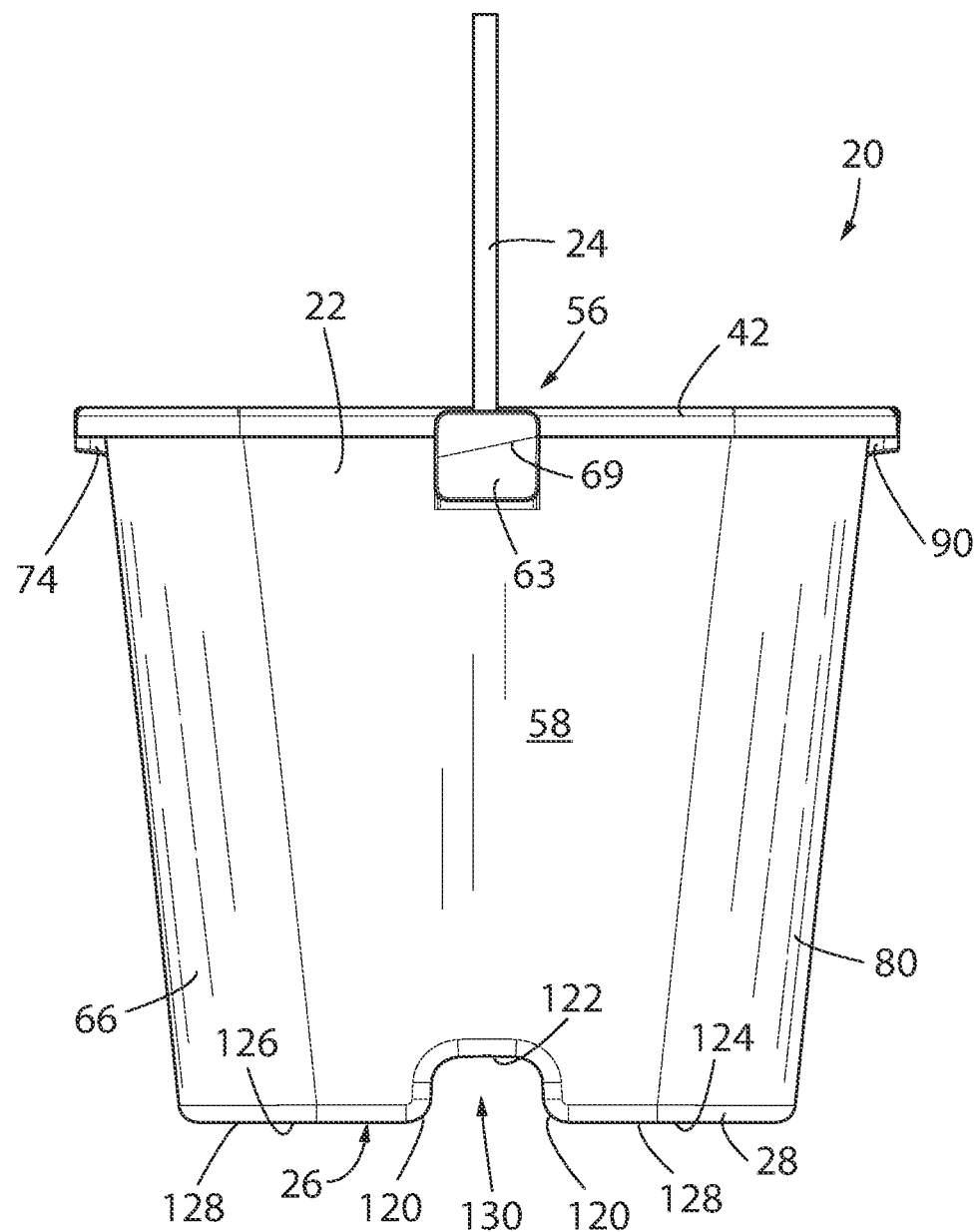
FIG. 4 is a right side elevation view of the sanitation pail system of FIG. 1.
Figure 5:
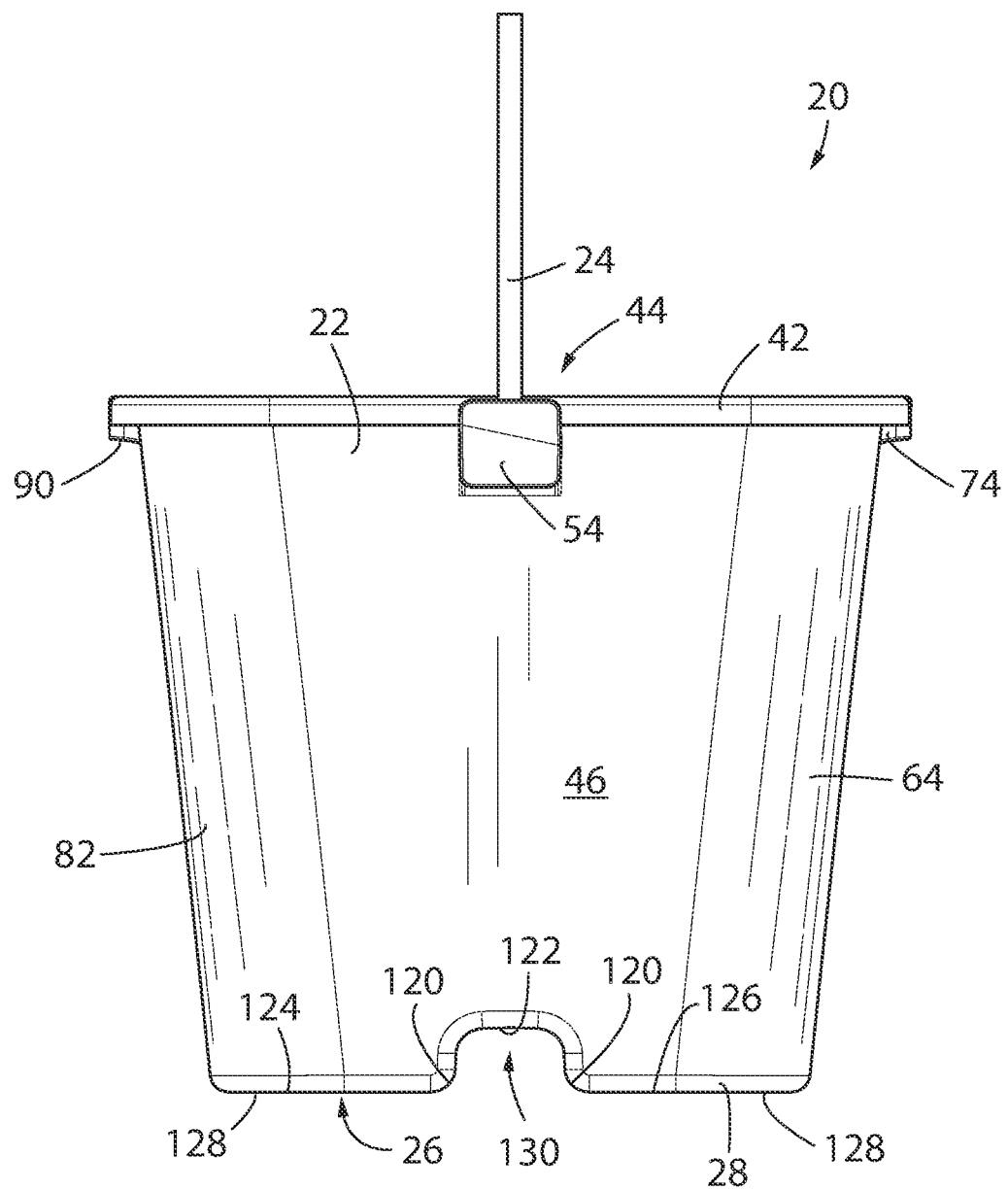
FIG. 5 is a left side elevation view of the sanitation pail system of FIG. 1.

The opposing second side wall of the sanitation pail system 20 includes a similar second boss or bail attachment point 56, which extends radially outward from an outer surface 58 of the second side wall 36, which is shown in FIGS. 1 and 4. The second bail attachment point 56 is preferably located proximate or adjacent the lip 42 at approximately a midpoint along the length of the second side wall 36, which is to say preferably equidistance from the front wall 30 and rear wall 32. The second bail attachment point 56 includes a bail receiving portion 60, such as a bar or post, about which a second end 62 of the bail 24 is rotatably attached. Lateral movement of the second end 62 of the bail 24 is inhibited by a bail retaining portion 63, which preferably has a larger cross sectional area than the bail receiving portion 60, thereby preventing the second end 62 of the bail 24 from sliding off or otherwise disengaging the bail receiving portion 60 during usage or pail system 20 for cleaning and sanitation processes and during the customary rotation of bail 24 relative to body 22.

Figure 2:
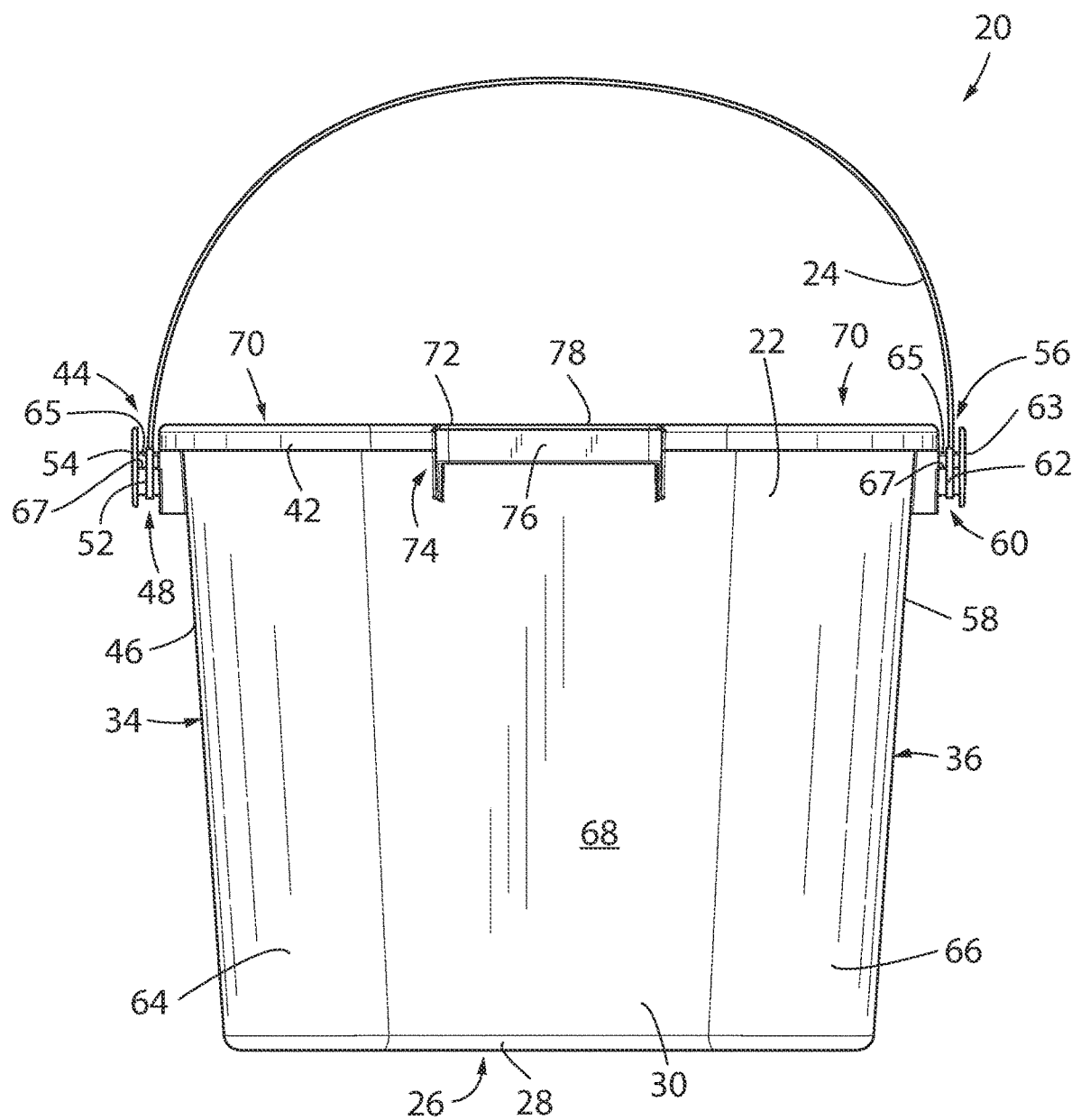
FIG. 2 is a front elevation view of the sanitation pail system of FIG. 1.
Figure 3:
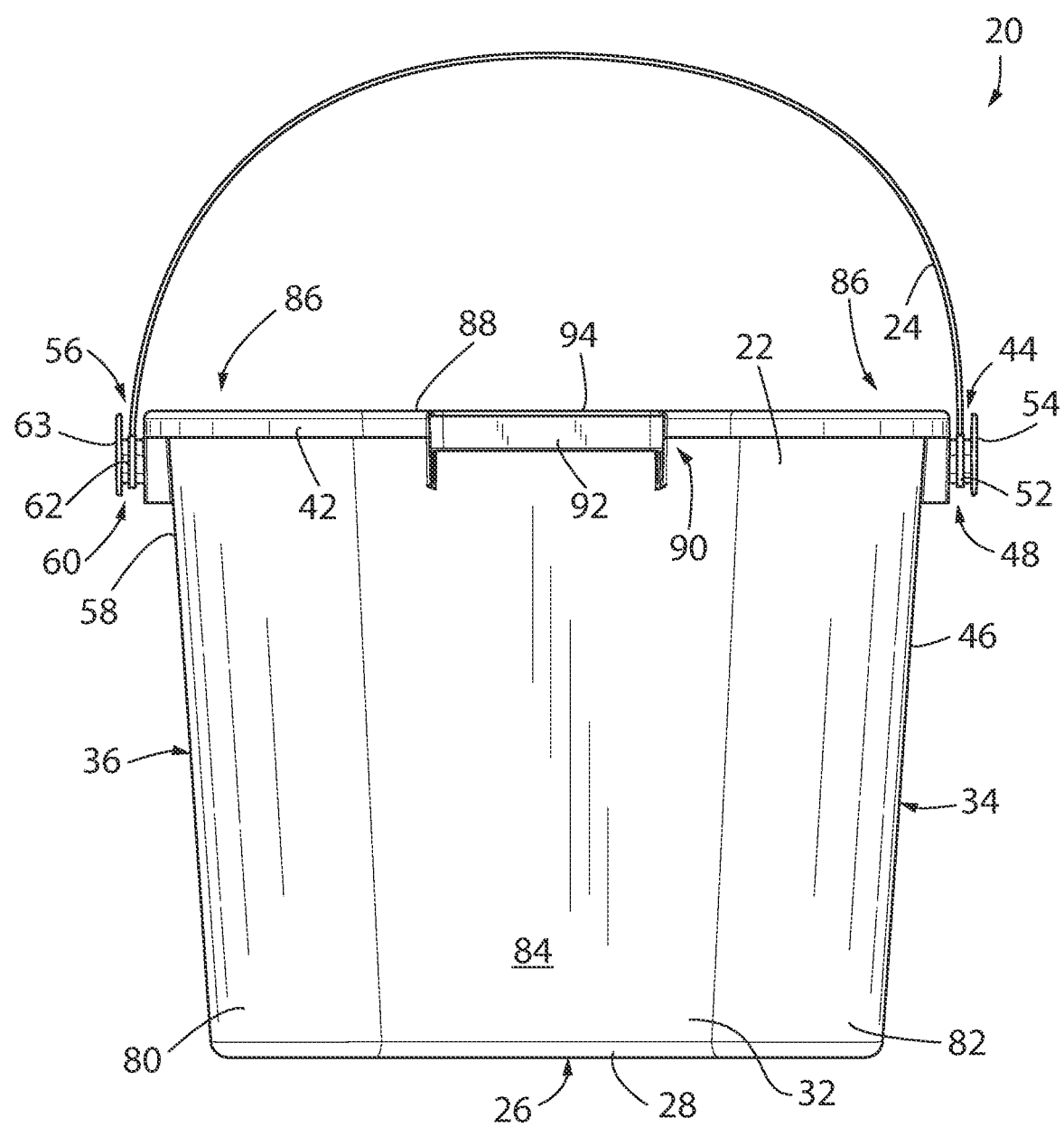
FIG. 3 is a rear elevation view of the sanitation pail system of FIG. 1.

Referring briefly to FIGS. 2 and 4, it should be appreciated that the generally opposite ends of bail 24 are constructed to be selectively but conveniently removed from discrete bail bosses 44, 56 if desired—such as for cleaning or the like of sanitation pail system 20. As understood in the industry, various entities, such as the National Sanitation Foundation (NSF), evaluate equipment intended for commercial applications and provide certifications or status indicators associated with commercial use of the same. Referring to FIG. 2, a view oriented transverse to the axis of rotation of bail 24 relative to body 22, it can be observed that the generally opposite lateral ends 65, 67 of discrete bail bosses 44, 56 which extend between body 22 and the respective bail retaining portions 54, 63 are oriented at different elevations relative to one another. As shown in FIG. 2, respective end 65 associated with bosses 44, 56 are oriented nearer lip 42 of body 22 than respective end 67 and whereas respective end 67 is oriented nearer base 26 than respective end 65 associated with each of bosses or bail attachment points 44, 56. As shown in FIG. 4, an indicia line 69 is preferably provided across the radially outward oriented face of one or more of first and second bail retaining portions 54, 63 and provides a visual indication as to the respective elevations associated with respective ends 65, 67 associated with discrete first and second bail attachment points.

The dissimilar elevations associated with ends 65, 67 associated with each of discrete first and second bail attachment points 44, 56 allows bail 24 to be conveniently removed from body 22 of sanitation pail system 20 when bail 24 is rotated relative to body 22 to a location below lip 42 and generally aligned with the incline associated with indicia line 69. Subsequent lateral translation of the respective ends 52, 62 of bail 24 relative to their respective bail attachment points 44, 56 in a slightly upward and crossing lateral direction relative to the axis between bail attachment points 44, 56 and relative to body 22 provides disengagement of the respective ends 52, 62 of bail 24 from body 22. The inclined crossing orientation between bail 24 and body 22 to effectuate the desired separation therebetween mitigates unintended or undesired separation of bail 24 from body 22 but allows convenient separation therebetween when cleaning or sanitation of the bail 24 and body 22 is desired. Further, the radially outward orientation associated with respective indicia lines 69 allows the user to quickly and conveniently re-associate bail 24 with body 22 for subsequent use of the same.

Referring briefly to FIG. 6, it should be appreciated that an axis defined by a line passing through bail attachment points 44, 56 defines the axis of rotation associate with the rotational association of bail 24 relative to body 22 and is oriented in a crossing directions relative to the pour locations defined by respective corners 64, 66, 80, 82 as disclosed further below. Still referring to FIGS. 1-5, front wall 30 of body 22 includes a first corner 64 that is positioned adjacent the first side wall 34 and an opposing second corner 66 that is positioned adjacent the second side wall 36. Front wall 30 includes a medial portion 68 that is disposed between the first corner 64 and second corner 66. The first corner 64 and second corner 66 are preferably rounded or radially curved along the longitudinal axis of sanitation pail system 20 as shown in FIG. 1, with the perimeter 28 of the base 26 and the upper lip 42 having a similar curvature. The curvature of the first corner 64 and second corner 66 define restricted fluid paths or channels 70 associated with cavity 38 and though which liquid may be poured out of the sanitation pail system 20 in an easily controlled fashion.

Medial portion 68 of the first wall 30 preferably includes a radially inward directed curvature or bias 72. As shown in FIG. 1, the bias 72 of the medial portion 68 of the first wall 30 is defined by an inwardly projecting arcuate portion. That is to say that the medial portion 68 of the first wall 30 includes a curvature along a longitudinal axis of sanitation pail system 20 that is generally opposite in direction to the curvature of the first corner 64 and second corner 66 associated with first wall 30. However, it should be understood that the bias 72 of the medial portion 68 of the first wall 30 need not be limited to such an arcuate curvature as illustrated in FIG. 1, and that other curvatures and or geometries of inwardly projecting medial portion 68 are considered within the scope of the present invention. As shown in FIG. 1, the portion of the perimeter 28 of the base 26 and the upper lip 42 that correspond to the medial portion 68 of the first wall 30 include a generally similar curvature or bias 72. That is to say that medial portion 68 exhibits an inwardly projecting bias 72 from its bottom edge, which is defined by a portion of the perimeter 28 of the base 26, to its upper edge, which is defined by a portion of the upper lip 42.

A first handle or handle portion 74 extends in a radially outward direction from upper lip 42 of the body 22 of the sanitation pail system 20 at the medial portion 68 of the first wall 30. That is to say that an outwardly extending first handle portion 74 is preferably congruent with the upper lip 42 at the medial portion 68, between the first corner 64 and second corner 66 of the body 22. As shown in FIG. 1, the first handle portion 74 extends from the upper lip 42 in a cantilevered manner to an outer side wall 76 thereof. A top side 78 of handle portion 74 extends, generally in line with or flush with the upper lip 42, from the upper lip 42 to the outer side wall 76. In one exemplary embodiment of the present invention, the side wall 76 lies in an imaginary plane defined by line A-A as shown in FIGS. 1 and 6, wherein the outer most edge of the first corner 64 and the second corner 66 are also disposed within the imaginary plane defined by line A-A. That is to say that the outer side wall 76 of the first handle portion 74 does not extend radially outboard of the outer most portion of the first corner 64 and second corner 66 of body 22.

In one embodiment of the present invention, shown in FIGS. 1-5, the outer most portion of the first corner 64 and second corner 66 are defined by a corresponding portion of the upper lip 42; however, it should be understood that the present invention is not so limited. In an alternative embodiment of the present invention, the side wall 76 of the first handle may be positioned inboard of the imaginary plane that is defined by the outermost portion of the first corner 64 and second corner 66. That is to say, as a result of the general curvature or bias 72 of medial portion 68 of the first wall 30, the entire first handle portion 74 may not extend to or radially outboard, past an outer most portion or edge of body 22 as defined by an imaginary line A-A that is tangent to the of the first corner 64 and second corner 66.

Still referring to FIGS. 1-5, opposing rear wall 32 is generally symmetrical with the proceeding discussion of the front wall 30. Rear wall 32 defines a third corner 80 of body 22 that is positioned adjacent the second side wall 36 and an opposing fourth corner 82 of body 22 that is adjacent the first side wall 34. Rear wall 32 includes a medial portion 84 that is disposed between the third corner 80 and fourth corner 82. The third corner 80 and fourth corner 82 are preferably rounded or radially curved along the longitudinal axis of sanitation pail system 20 as shown in FIG. 1, with the perimeter 28 of the base 26 and the upper lip 42 including a similar curvature to one another and the first corner 64 and second corner 66. Like first and second corners 64, 66, the curvature of the third corner 80 and fourth corner 82 define restricted fluid paths or channels 86 in the cavity 38 though which liquid may be poured out of the sanitation pail system 20 in an easily controlled fashion.

Still referring to FIGS. 1-5, the medial portion 84 of rear wall 32 preferably includes an inward curvature or bias 88. The bias 88 of the medial portion 84 of the rear wall 32 is defined by an inwardly projecting arcuate portion, similar and opposite to the curvature or bias 72 of the medial portion 68 of the front wall 30. That is to say that the medial portion 84 of the rear wall 32 includes a curvature that is oriented along the longitudinal axis of sanitation pail system 20 that is generally opposite in direction to the curvature of the third corner 80 and fourth corner 82 of the rear wall 32. However, it should be understood that the bias 88 of the medial portion 84 of the rear wall 32 need not be limited to such an arcuate curvature as illustrated in FIG. 1, and that other curvatures and/or geometries of inwardly projecting medial portion 84 are considered within the scope of the present invention. As shown in FIGS. 1, 6, and 7, the portion of the perimeter 28 of the base 26 and the portion of upper lip 42 that correspond to the respective medial portions 68, 84 of front wall 30 and rear wall 32 include generally similar curvatures or biases 72, 88. That is to say that the medial portion 84 exhibits an inwardly projecting bias 88 from its bottom edge, which is defined by a portion of the perimeter 28 of the base 26, to its upper edge, which is defined by a portion of the upper lip 42.

Body 22 of sanitation pail system 20 includes a second handle or handle portion 90 that extends in an outward radial direction from medial portion 84 of body 22 proximate lip 42 associated with rear wall 32. Outwardly extending second handle portion 90 is preferably congruent with the upper lip 42 at the medial portion 84, between the third corner 80 and fourth corner 82 of the body 22. As shown in FIG. 1, the second handle portion 90 extends from medial portion 84 proximate upper lip 42 in a generally cantilevered manner and terminates at a free end defined by an outer side wall 92 of second handle portion 90. A top side 94 of second handle portion 90 extends generally in-line with or flush with the upper surface of lip 42 to the outer side wall 76.

In one exemplary embodiment of the present invention, side wall 92 is disposed radially inboard of an imaginary line B-B that tangentially intersects each of third corner 80 and the fourth corner 82. That is to say that the outer side wall 92 defined by second handle portion 90 does not extend radially outboard of the outer most portion of the third corner 80 and fourth corner 82. In one embodiment of the present invention, shown in FIG. 1, the outer most portion of the third corner 80 and fourth corner 82 are defined by a corresponding portion of the upper lip 42; however, it should be understood that the present invention is not so limited. In an alternative embodiment of the present invention, the side wall 92 of the second handle portion 90 may be positioned radially inboard of an imaginary plane that is tangential to the outermost portion of the third corner 80 and fourth corner 82 of body 22. That is to say, as a result of the general curvature or bias 88 of medial portion 84 of the rear wall 32, the entire second handle portion 90 may not extend outwardly, past an outer most portion of the third corner 80 and fourth corner 82.

As described above, the body 22 of the sanitation pail system 20 is generally defined by a bottom or base 26 that is defined by a perimeter 28 that extends about the outer edge of the base 26, as is partially shown in FIG. 1. Turning now to FIG. 6, the base 26 of the body 22 is shown in more detail from a top plan view of the sanitation pail system 20. In one illustrated embodiment, the base 6 includes a raised portion 96 that is preferably centrally located relative to the plan view of base 26, a first side portion 98 that is located between the raised portion 96 and the front wall 30, and a second side portion 100 that is located on the opposite the first side portion 98, between the raised portion 96 and the rear wall 32. Raised portion 96 associated with base 26 defines a rest associated with supporting a cleaning device or implement in a raised orientation relative to the flanking respective side portions 98, 100 defined by base 26.

In one embodiment of the present invention, the raised portion 96 includes a cavity facing surface or top surface 104 that is raised relative to at least one of the height or cavity facing or the top surface 106 of the first side portion 98 and the cavity facing or top surface 108 of the second side portion 100, respectively. That is to say that the upper most surface of the raised portion 96 of the body 22 is higher or nearer lip 42 of body 22 than upper most surfaces of the laterally adjacent side portion 98, 100. A first side wall 110 extends between the upper surface 106 of the first side portion 98 to the upper surface 104 of the raised portion 96, while a second side wall 112 extends between the upper surface 108 of the second side portion 100 and the upper surface 104 of the raised portion 96, on the side opposite the first side wall 110.

Still referring to FIG. 6, the first and second side walls 110, 112, may be curved to prevent the debris or small solid waste from becoming entrapped along the edge; however, it should be understood that the present invention is in no way so limited and other transitional contours are considered within the scope of the present invention. Preferably, a series of baffles 114 may extend over the top surfaces 106, 108 of the respective first side portion 98 and second side portion 100, between the corresponding front or rear wall 30, 32 to the raised portion 96. The spaced apart baffles 114 are positioned along the top surface 106, 108 of the base 26 of the body 22, and define individual wells 116 that are separated by adjacent baffles 114. In use, the raised height of the baffles 114, relative to the portion of the corresponding top surface 106, 108 that form the wells 116 inhibits water of fluid movement within the discrete wells 116. Resultantly, debris or sediment that has collected in the sanitation pail system 20 settles toward the corresponding top surface 106, 108 via gravity, and is received in the wells 116 where its movement will be restricted by contacting the bordering baffles 114, side walls 110, 112 and or wall 30, 32. Such restricted movement of the debris or sediment within the wells 116 inhibits its potential for resuspension in the washing fluid, or contact with the washcloth, sponge, or other cleaning device or implement.

Furthermore, in combination, the top surface 104 of the raised portion 96 of the bottom or base 26, as well as the top most edge of the series of baffles 114 provides a relatively higher surface for the washcloth or rag to rest upon, as compared to the corresponding cavity facing or top surface 106, 108 defined the wells 116. That is to say in use, as smaller debris or sediment that has collected in the sanitation pail system 20 is pulled down into the wells 116 via gravity, the washcloth or rag will remain relative higher as it is pulled down to rest upon the top surface 104 of the raised portion 96. In this configuration the washcloth or rag rests on a surface that is not occupied by debris or sediment, thereby preventing such debris or sediment from being pulled back out of the sanitation pail system 20 during rinsing or removal of the cleaning device from pail system 20. To further facilitate separation of the debris or sediment from the surrounding fluid, the top surface 104 of the central portion may also be crowned or angled, which will further facilitate separation of debris or sediment from the treatment solution and direct the same into the adjacent wells 116.

Figure 8:
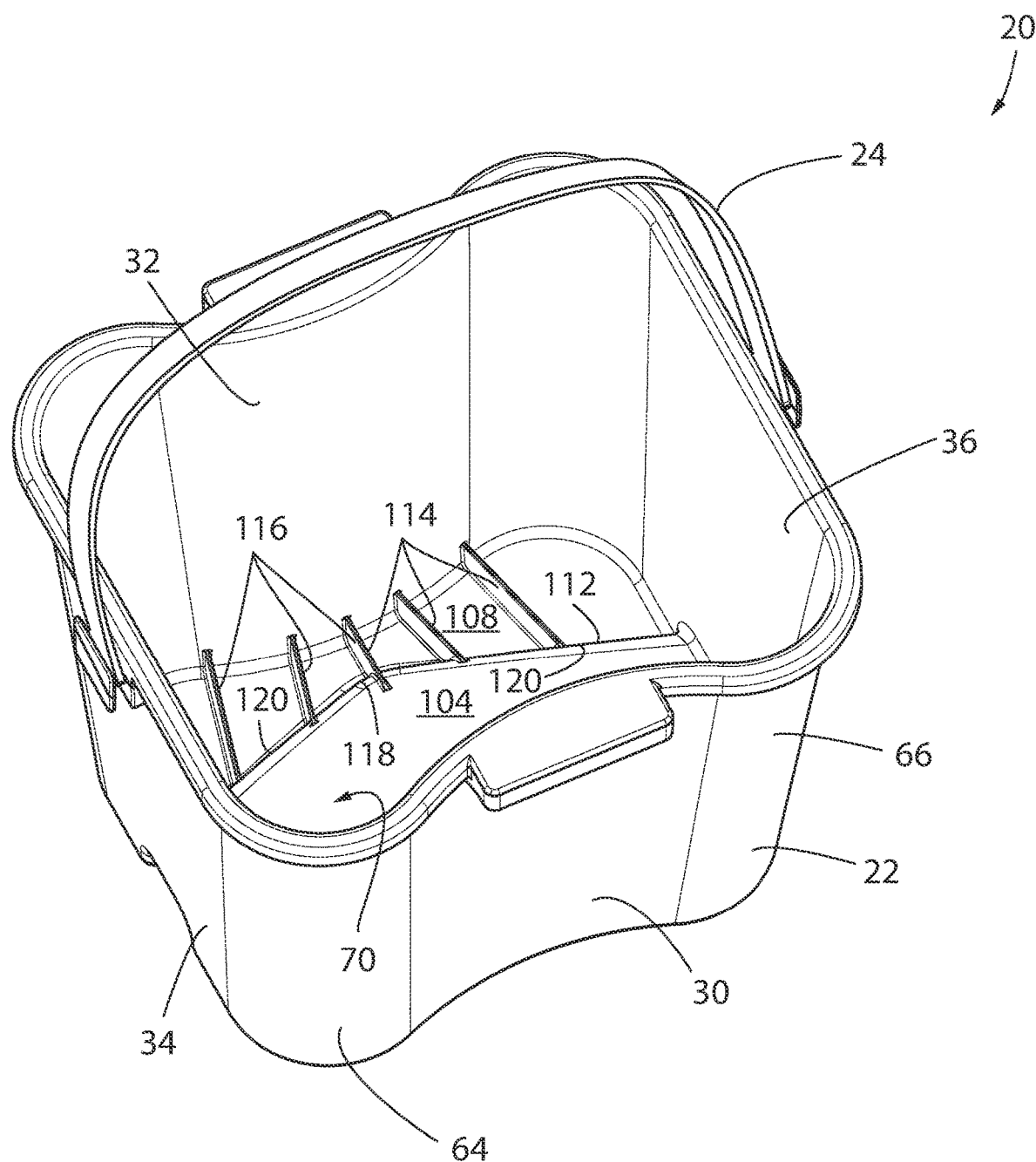
FIG. 8 is a perspective view of the sanitation pail system of FIG. 1 taken from the front and right side of the body showing the pail being tilted toward a respective corner of the body and showing a portion of the fluid cavity facing surface of the bottom of the pail.
Figure 9:
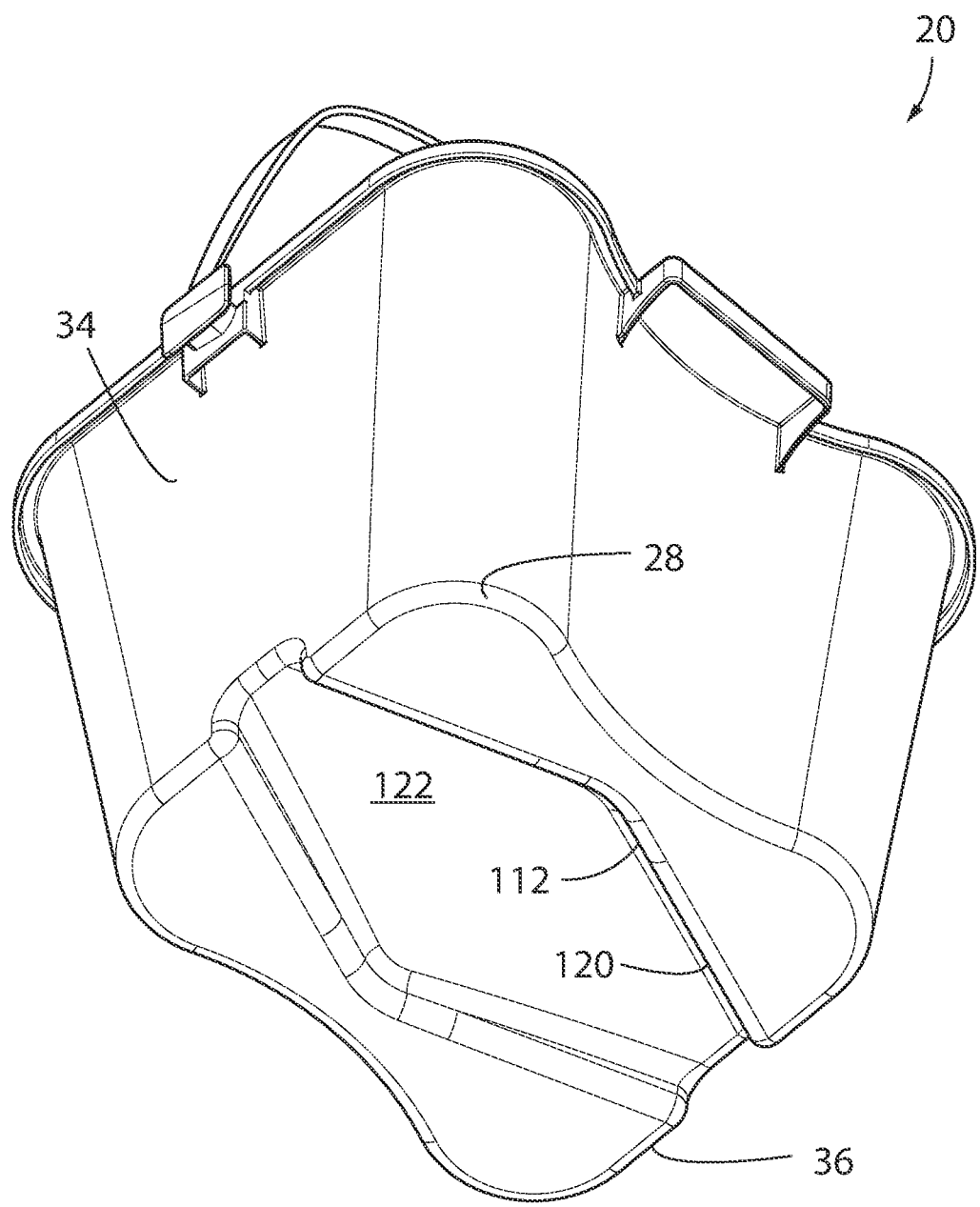
FIG. 9 is a perspective view of the sanitation pail system of FIG. 1 taken from a rear and left side of the body showing the underside of the pail when in the tilted orientation shown in FIG. 8.

Still referring to FIG. 6, the raised portion 96 of the bottom 26 has a generally diamond shape, in which the side walls 110, 112 are not linear, but rather each include an obtuse angle 118 defined by side walls 110, 112 generally at a midline portion of each side wall 110, 112. That is to say each of the side walls 110, 112 are divided by a relatively centrally located angle 118, which separates each of the two side walls 110, 112 into two wall segments 120 of approximately equal length. As shown in FIG. 6, each of the respective linear wall segments 120 is angled approximately between 30° and 60° to a corresponding side wall 34, 36 of the body 22, which is to say that each respective linear wall segment 120 is angled approximately perpendicular to a corresponding corner 64, 66, 80, 82. Resultantly, as will be described in further detail below, the underside of an opposing linear wall segments 120 may be grasped by a user to facilitate tipping the sanitation pail system 20 when fluid is being poured from a given corner 64, 66, 80, 82. By way of example, FIGS. 8 and 9 illustrate one configuration in which the sanitation pail system 20 has been tilted such that a fluid may be poured from the restricted fluid paths or channel 70 formed at corner 64. As shown in FIGS. 8 and 9, the opposing linear wall segment 120 is positioned at a height greater than the height of corner 64, facilitated by a user (not shown) grasping and raising the opposing linear wall segments 120 with one hand while grasping the bail 24 in the other hand, about which the body 22 rotates.

Turning now to FIGS. 7-9, the underside of the base 26 of the body 22 is shown, where the bottom surface 122 of the raised portion 96 of base 26 is shown recessed relative to the bottom surface 124 of the first side portion 98 and the bottom surface 126 of the second side portion 100, consistent with the preceding discussion. The underside of the linear wall segments 120 of the side walls 110, 112 are further shown relative to the corresponding corners 64, 66, 80, 82 of the body 22, where they may define handles used for tipping and emptying the sanitation pail system 20, as described above.

The plurality of wall segments 120 associated with side walls 110, 112 (and the grip sites defined thereby); the pivotable cooperation of bail 24 with body 22; the radially inboard orientation of handle portions 74, 90; the positioning of handle portions 74, 90 proximate lip 42; the various pouring locations associated corners 64, 66, 80, 82; and the non-orthogonal association between the various discrete features thereof, allow a more comfortable and ergonomic user interaction and use of pail system 20. That is, pail system 20 is configured to mitigate overreaching or extending associated with transport and pouring activities and is constructed to provide a more comfortable user interaction therewith and in a manner that can accommodate discrete preferences of discrete users of sanitation pail system 20.

Furthermore, the bottom surface 124 of the first side portion 98 and the bottom surface 126 of the second side portion 100 also defining raised feet 128 upon which the sanitation pail system 20 may be placed on a support surface, with the opposing lateral feet 128 being separated from one another by a recess 130 that extends from side wall 34 to side wall 36 along the bottom surface 122 of the central portion 96, as well as the convenient removability associated with the rotational interaction of bail 24 with body 22, provides a sanitation pail system 20 whose own sanitation can be conveniently and expeditiously maintained.

Although a specific embodiment of sanitation pail system 20 is illustrated in the drawings and discussed above, it is understood that the size and shape of the sanitation pail system 20 may vary greatly to accommodate the various volumes of the cavity 38 within the body 22 of the respective sanitation pail system 20. That is to say that the sanitation pail system 20, described above and shown in FIGS. 1-9 may be provided with a volume or cavity 38 that is sufficient to retain approximately between 1 fluid quart and 25 fluid quarts, and more preferably between approximately between 3 fluid quarts and 15 fluid quarts, all of which are considered will within the scope of the present invention.

Further, the invention may be implemented in a variety of configurations, using certain features or aspects of the embodiments described herein and others known in the art.

Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter of the claims.

What is claimed is:

1. A sanitation pail system comprising:
   a body having a bottom and series of walls extending upwardly from the bottom toward an open end of the body such that the bottom and series of walls define a fluid cavity within the body;
   the bottom of the body defined by a first side portion, a second side portion, and a generally planar raised portion that is generally centrally located within the bottom and further disposed between the first and second side portions such that a surface of the raised portion that faces the fluid cavity is nearer the open end of the body than a fluid cavity facing surface of each of the first and second side portions;
   a plurality of baffles that extend along a respective one of the first side portion and the second side portion of the bottom of the body in respective outward radial directions between the generally planar raised portion and an opposing one of the series of walls of the body;
   the series of walls comprising at least a first wall and an opposing second wall, wherein a medial portion of the first wall defines a first inwardly extending arcuate portion and wherein a medial portion of the second wall defines a second inwardly extending arcuate portion; and
   a first handle that extends radially outward from the medial portion of the first wall.

2. The sanitation pail system of claim 1 wherein the series of walls further comprises a third wall and a fourth wall that is opposite third wall, the third wall and the fourth wall extending between respective opposing ends of the first wall and the second wall;
   a first bail attachment point disposed on an outer surface of the third wall proximate the open end of the body; and
   a second bail attachment point disposed on an outer surface of the fourth wall proximate the open end of the body.

3. The sanitation pail system of claim 2, wherein the third wall and fourth wall are substantially planar.

4. The sanitation pail system of claim 3, wherein a lateral cross section of the body passing through the series of walls is generally hourglass shaped.

5. The sanitation pail system of claim 2 further comprising a rounded corner disposed between adjacent walls in the series of wall, wherein the rounded corners have a curvature that is generally directionally opposite a curvature of an adjacent inwardly extending arcuate portion.

6. The sanitation pail system of claim 5 wherein outermost portion of a first rounded corner disposed at a first end of the first sidewall and an outermost portion of a second rounded corner disposed at a second end of the first sidewall each lie in a first imaginary plane that defines an outermost edge of the body; and the first handle that further extends radially outward from the medial portion of the first wall proximate the open end and lies radially inboard of the first imaginary plane.

7. The sanitation pail system of claim 6 wherein an outermost portion of a third rounded corner disposed at a first end of the second sidewall and an outermost portion of a fourth rounded corner disposed at a second end of the second sidewall each lie in a second imaginary plane that defines another outermost edge of the body; and
 a second handle that extends radially outward from the medial portion of the second wall proximate the open end and lies radially inboard of the second imaginary plane.

8. The sanitation pail system of claim 1 wherein the raised portion further defines a first side wall that is between the raised portion and the first side portion of the bottom, and a second side wall that is between the raised portion and the second side portion of the bottom, and wherein,
 an underside of the first and second side walls each define handles oriented to facilitate tilting of the body toward a respective rounded corner defined by the series of walls.

9. The sanitation pail system of claim 1 wherein the fluid cavity of a first sanitation pail system is configured to receive the body of a second sanitation pail system therein, in a nested configuration.

10. The sanitation pail system of claim 1 wherein the first side portion of the bottom is disposed between the raised central portion and the first side wall, and wherein the second side portion of the bottom is disposed between the raised central portion and the second side wall.

11. The sanitation pail system of claim 10, wherein the plurality of baffles includes a first series of baffles extending along the fluid cavity facing surface of the first side portion of the bottom between the first side wall and the raised portion, and a second series of baffles extending along the fluid cavity facing surface of the second side portion of the bottom between the second side wall and the raised central portion.

12. A sanitation pail system comprising:
 a body having a bottom and an open end, a series of walls extending upwardly from the bottom to a lip, and a corner formed between adjacent walls in the series of walls, to collectively define a fluid cavity within the body;
 the bottom of the body defining a raised portion that is disposed between a first side portion and a second side portion of the bottom; wherein an upper surface of the raised portion is nearer the open end of the body than an upper surface of both the first and second side portions;
 the series of walls comprising at least a first wall and an opposing second wall that extend in a generally upward direction proximate a respective one of the first side portion and the second side portion of the bottom and such that each of the first wall and the opposing second wall are offset from the raised portion of the bottom, wherein a medial portion of the first wall defines a first inwardly extending arcuate portion and wherein a medial portion of the second wall defines a second inwardly extending arcuate portion;
 a first handle extending outwardly from the medial portion of the first wall proximate the open end, wherein the first handle is adjacent to the lip, wherein the first handle lies radially inboard of an outermost portion of an adjacent corner, wherein the first handle is positioned inboard an imaginary plane defined by the outermost portion of the adjacent corner; and
 a second handle extending outwardly from the medial portion of the second wall proximate the open end, wherein the second handle is adjacent to the lip, wherein the second handle lies radially inboard of an outermost portion of an adjacent corner, wherein the second handle is positioned inboard an imaginary plane defined by the outermost portion of the adjacent corner.

13. The sanitation pail system of claim 12 having a third wall and a fourth wall that each extend between the first wall and the second wall;
 a first bail attachment point disposed on an outer surface of the third wall proximate the open end of the body; and
 a second bail attachment point disposed on an outer surface of the fourth wall proximate the open end of the body.

14. The sanitation pail system of claim 13, wherein the third wall and fourth wall are substantially planar.

15. The sanitation pail system of claim 14, wherein a latitudinal cross section of the body has a generally hourglass shape.

16. The sanitation pail system of claim 12 wherein each corner disposed between each of the adjacent walls in the series of wall further define rounded corners having a curvature that is generally directionally opposite a curvature of an adjacent inwardly extending arcuate portion.

17. The sanitation pail system of claim 12 wherein the raised portion further defines a first side wall between the raised portion and the first side portion of the bottom, and an opposite second side wall between the raised portion and the second side portion of the bottom, and wherein,
 an underside of the first and second side walls define handles that are configured to be grasped while tilting the body.

18. The sanitation pail system of claim 12 wherein the fluid cavity of a first sanitation pail system is configured to receive the body of a second sanitation pail system therein, in a nested configuration.

19. The sanitation pail system of claim 12 wherein the first side portion of the bottom is disposed between the raised portion and the first side wall, and wherein the second side portion of the bottom is disposed between the raised portion and the second side wall.

20. The sanitation pail system of claim 19, further comprising a first series of baffles extending along at least a portion of the upper surface of the first side portion of the bottom between the first side wall and the raised portion, and a second series of baffles extending along at least a portion of the upper surface of the second side portion of the bottom between the second side wall and the raised portion.

21. A method of providing a sanitation pail system, the method comprising:
 forming a body having a bottom, a series of walls extending upwardly from the bottom, and an open end opposite the bottom such that the body has an hourglass cross-sectional shape;
 forming the bottom to include a first portion that is generally centrally located within the bottom, wherein the first portion is nearer the open end than a second portion of the bottom such that an open end facing surface of the first portion defines a cleaning device rest and an outward oriented surface between the first portion and the second portion defines at least one grip site associated with the bottom of the body;

forming the body to define at least one handle proximate the open end of the body and at a constriction associated with the hourglass cross-sectional shape and such that the at least one handle does not extend beyond an imaginary line that is tangent to adjacent corners of the body defined by at least one of the series of walls, wherein the at least one handle lies radially inboard of an outermost portion of adjacent corners; and forming a pair of bail bosses that are defined by the body at a location proximate the open end and oriented such that an axis of rotation defined by the bail bosses is aligned with the first portion of the bottom and such that both the axis of rotation defined by the bail bosses and the first portion of the bottom are oriented orthogonal to the constriction of the hourglass cross-sectional shape and is oriented at a crossing direction relative to an imaginary plane extending from the grip site.

* * * * *